Figure 1:
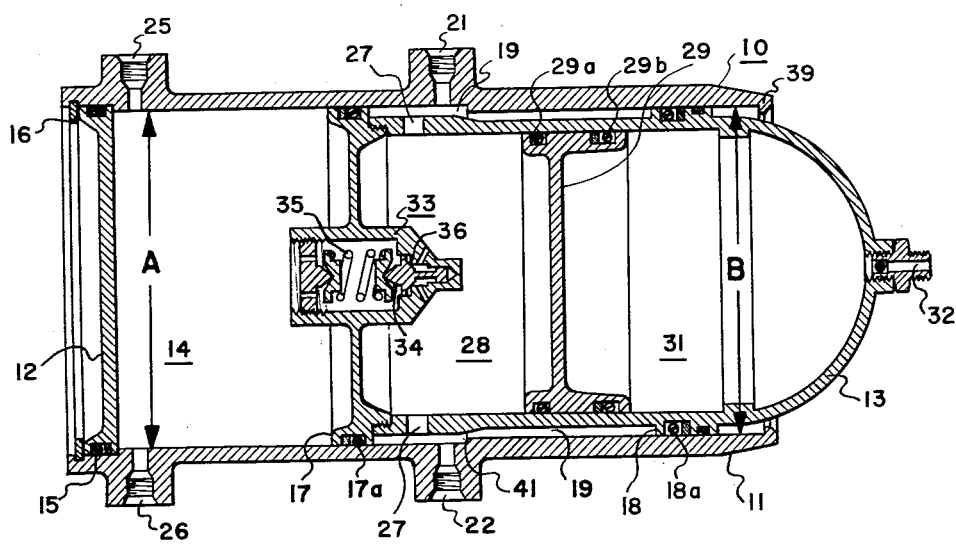

Jan. 2, 1962 V. G. MICHAEL 3,015,345
COMBINATION RESERVOIR-ACCUMULATOR ARRANGEMENT
FOR HYDRAULIC SYSTEM
Filed June 2, 1958

INVENTOR.
VILO G. MICHAEL
BY
Julian C. Renfro
ATTORNEY

United States Patent Office 3,015,345
Patented Jan. 2, 1962

3,015,345
COMBINATION RESERVOIR-ACCUMULATOR ARRANGEMENT FOR HYDRAULIC SYSTEM
Vilo G. Michael, Denver County, Colo., assignor to Martin-Marietta Corporation, a corporation of Maryland
Filed June 2, 1958, Ser. No. 739,391
10 Claims. (Cl. 138—31)

This invention relates to a pressurized reservoir device for use in a fluid system, and more particularly to a reservoir-accumulator-relief valve arrangement incorporated into a single integrated unit ideally suited for use in environments where weight and space must be minimized.

Hydraulic systems utilized in missile installations, for example, require positive oil pressure to be maintained on the suction side of the hydraulic pump of the system, regardless of outside effects such as acceleration forces acting upon the system. Otherwise the inlet side of the hydraulic pump could be starved for hydraulic fluid at the time of the greatest demand for pressure in the system.

It is also desirable in most hydraulic systems of this type to utilize an accumulator not only to serve the primary function of storing energy, but also to serve the function of dampening pressure surges. Most aircraft and missile hydraulic systems have varying demands for hydraulic energy during operation, and rather than utilizing a pump that will supply the maximum system demand, it is often more practical, both weight-wise and power supply-wise, to use a pump that will supply only a percentage of the maximum demand, with the difference being made up by hydraulic fluid stored at high pressure in the accumulator. Prior art units incorporating pressurized reservoir devices and accumulators have suffered the disadvantage of large, complicated arrangements and in general have involved such considerable bulk as to be difficult to be accommodated on a missile, or even in the allocated space of some aircraft.

According to the present invention, a combination accumulator, pressurized reservoir and pressure relief valve unit is provided at great savings in weight, which eliminates many of the disadvantages typically associated with prior art arrangements. The hydraulic pump (or pumps) to be utilized with the system is arranged to deliver all of its fluid through the accumulator portion of the device, which serves the functions of dampening pressure surges, as well as storing pressurized fluid in the accumulator for subsequent high demand use. The present device advantageously utilizes a portion of the system pressure for pressurizing the hydraulic reservoir of the device according to the so-called "bootstrap" principle, so consequently, the inlet side of the hydraulic pump of the system will always be pressurized. Furthermore, by integrating these vital components of a hydraulic system into a combination unit, a number of fittings and seals can be eliminated, thus minimizing the number of components of the system, increasing the system reliability, and in general simplifying the necessary plumbing arrangements. In one particular missile it was found that approximately 15% of over-all hydraulic system weight was saved by incorporating the present hydraulic package unit instead of separate components according to the prior art, and approximately 20% of the hydraulic line fittings and seals were eliminated.

More particularly this invention utilizes a reservoir housing having a closed end, and an accumulator assembly located in the housing in sealed relation therewith for longitudinal movement toward and away from the closed end, and defining with the closed end a reservoir of variable capacity. Circumferential, ring-like members are provided in spaced relation on the exterior of the accumulator assembly, with the diameter of each ring-like member being such as to fit closely into the respective inner portion of the housing. These spaced ring-like members define an essentially toroidally-shaped high pressure chamber between the inner surface of the housing and the outer surface of the accumulator assembly, and fluid port means are located in the wall of the housing for providing fluid communication to the high pressure chamber. The ring-like members are constructed to present different areas to the hydraulic fluid, and the difference in areas of the ring-like members multiplied by the system pressure manifested in the high pressure chamber provides a net force tending to move the accumulator assembly toward the closed end of the housing so as to pressurize fluid contained in the reservoir.

Figure 2:
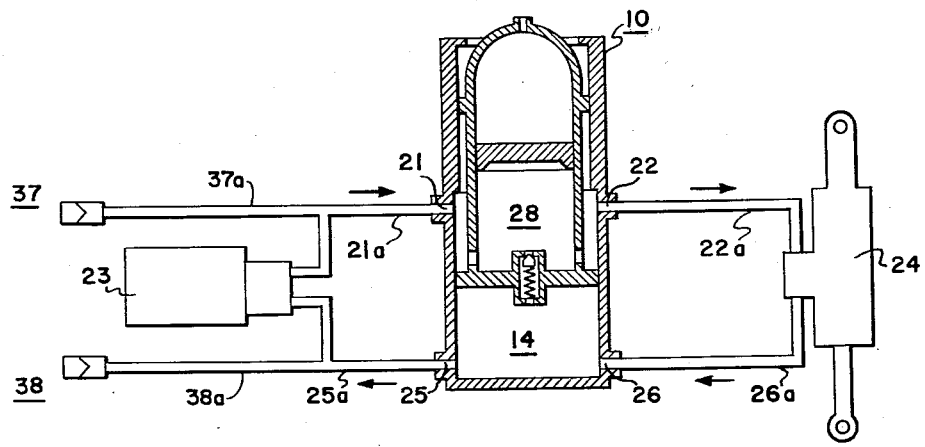

Additional fluid port means are provided for fluid communication from the high pressure chamber to one portion of the accumulator assembly, and piston means movable in sealed relation inside the accumulator assembly, is in contact with the pressurized fluid. Compressible means are located in a second portion of the accumulator assembly on the remote side of the piston means from the fluid whereby the piston means can move during changes in demand for high pressure fluid in the system to provide accumulator function for the system. A pressure relief valve may be located in the accumulator assembly between the accumulator portion and the reservoir portion of the device whereby excess system pressure can be ported directly into the reservoir. Other features and advantages of this invention will be apparent upon an inspection of the drawing in which:

FIGURE 1 is a longitudinal cross-sectional view of an exemplary pressurized reservoir-accumulator device according to this invention; and FIGURE 2 is a schematic illustration of a typical hydraulic system with which this invention may be used.

Referring to the drawing, in FIGURE 1 is illustrated a longitudinal cross-sectional view of an exemplary accumulator-pressurized reservoir 10 according to this invention. Reservoir housing 11 has a closed end formed by member 12 secured in the housing such as by a snap ring 16, and an accumulator assembly 13 in the form of a piston member located in the housing for longitudinal movement toward and away from the closed end. The accumulator assembly is arranged to interfit in sealed relation with said housing, and to define with the closed end a reservoir 14 of variable capacity. End member 12 is fitted with an appropriate pressure seal 15 such as an O ring and may be quickly removed for installation or repair of the accumulator assembly.

Accumulator assembly 13 has integral spaced circumferential ringlike members 17 and 18, much in the nature of piston rings, closely fitted to respective inner diameter portions of housing 11. As will be noted on the drawing, the inner diameter of housing 11 at location A is somewhat larger than the inner diameter at location B, so correspondingly, member 17 is of somewhat greater diameter and greater area than member 18. Appropriate sealing members 17a and 18a, respectively, are provided around the entire circumference of members 17 and 18 so that no leakage of pressure occurs across these members. These sealing members may be O rings, with which Teflon or leather back-up rings may be used. The ring-like members 17 and 18 define an essentially toroidally-shaped high pressure chamber 19 between the inner surface of housing 11 and the outer surface of piston member 13, and fluid port means such as ports 21 and 22 may be provided in the wall of housing 11 for admitting fluid into high pressure chamber 19.

Referring to FIGURE 2 of the drawing, it will be seen that port means 21 may be connected to high pressure line 21a connected to hydraulic pump 23, and port means 22 may be connected to the other side 22a of the high pressure line, which carries fluid to actuator 24. Actuator 24 represents, for example, a device used for bringing about desired motion of a flight controlling surface of a missile or aircraft, or for adjusting the vernier nozzles of a rocket motor to control thrust. While for the sake of simplicity only one actuator has been shown, it is to be understood that two or more actuators can be employed within the spirit of this invention. Similarly, additional fluid port means 26 are connected to line 26a that receives the return fluid from actuator 24, and fluid port means 25 is attached to line 25a that connects the reservoir 14 with the suction side of pump 23.

Pump 23 can, for example, be driven by a turbine associated with the motor of a rocket, or alternatively can be electrically driven.

Returning to FIGURE 1, it will be seen that pressure fluid admitted through the high pressure port means will be allowed to manifest itself in high pressure chamber 19. Because ring-like member 17 presents a somewhat larger area than ring-like member 18, a net force will be created as a result of system pressure in chamber 19, tending to bias the accumulator assembly 13 toward the closed end 12 of housing 11. More particularly, the difference in areas of the ring-like members, multiplied by the pressure of the high pressure fluid in chamber 19 amounts to a net force biasing accumulator assembly 13 so as to pressurize fluid contained in reservoir 14, thereby insuring the proper flow of return fluid to pump 23 for reuse in the system. Flange 39 on the open end of housing 11 limits travel of the accumulator assembly, and is preferably arranged to stop motion of member 13 toward the right as shown in FIGURE 1 before ring-like member 17 hits the shoulder 41 on the inner surface of housing 11 created between the two different inner diameter portions.

Piston member 13 may advantageously incorporate an accumulator arrangement therein, and to that end, one or more ports 27 are provided in the wall of piston member 13 between members 17 and 18 so as to allow high pressure fluid to flow from chamber 19 into the accumulator position 28 of said piston member. Inner piston means such as piston 29 is provided in member 13, this inner piston being slideable for a substantial length along the inner surface of member 13 in sealed relation therewith. Appropriate sealing means 29a and 29b are provided on piston 29, which may be O rings provided with leather or Teflon back-up rings. Compressible means are contained in space 31 on the remote side of piston 29 from accumulator chamber 28, and this means tends to bias piston 29 in the direction so as to force hydraulic fluid into the system. This biasing means may advantageously be pressurized gas such as nitrogen, admitted to chamber 31 by a means of check valve 32. Accordingly, it will be seen that the inner portion of piston member 13 functions as an accumulator, because piston 29 can move longitudinally along the inside portion of member 13 so as to accommodate changes in volume of fluid being utilized in the system.

The pressurized reservoir device according to this invention may also incorporate a pressure relief valve 33 located in the larger end of piston 13. Movable valve member 34 is normally biased by spring 35 into sealing relation with valve seat 36, but upon the pressure in chamber 28 building up to an undesirably high value, spring 35 will be overcome, and valve 34 will be moved so as to allow the flow of high pressure fluid directly in the reservoir 14.

Appropriate ground supply disconnects 37 and 38 may be provided on lines 37a and 38a, connected to lines 21a and 25a, respectively, if desired. These disconnects are, for example, associated with an "umbilical" arrangement used to supply the hydraulic system of the missile with fluid before the firing of the missile.

The operation of this invention is as follows: The reservoir housing 11 is typically incorporated into a fluid pressure system much in the manner illustrated in FIGURE 2, that is with the high pressure port or ports connected to high pressure chamber 19, and with the low pressure port or ports connected to reservoir 14. The full system pressure, which may be in the order of magnitude of 3,000 lbs. per sq. in., is accordingly allowed to manifest itself in chamber 19, which pressure, when multiplied by the difference in area of the circumferential ring-like members on member 13 results in a net thrust tending to bias member 13 in the direction so as to pressurize the fluid contained in reservoir 14 to a desired extent, for example, to $1/75$ of system pressure.

System pressure also manifests itself in accumulator chamber 28, where variations in the quantity of fluid being utilized in the high pressure portion of the system are compensated for by movement of inner piston 29 against a biasing means such as pressurized nitrogen gas. Relief valve means is provided in the larger end of piston member 13 so that in the event of the system pressure building to an undesirably high value, such pressure can be relieved directly into reservoir 14.

The hydraulic package is precharged by means of valve 32 to some predetermined pressure, usually between $1/3$ and $2/3$ of system pressure. This moves piston 29 to the left as seen in FIGURE 1, until it engages an appropriate stop. The accumulator chamber 28 is then subjected to system pressure, and piston 29 moves to the right to accommodate the hydraulic fluid until such time as the pressure in chamber 31 is equal to system pressure.

It is to be realized that this invention has been described in conjunction with an exemplary device, and that this invention is not to be limited thereto except as required by the appended claims. This invention is capable of use in environments other than missile and aircraft use, and although it has been described with respect to a hydraulic system, it could be utilized in conjunction with other fluid systems.

I claim:

1. A pressurized reservoir for use in a fluid system in which a demand for high pressure fluid may change, comprising a reservoir housing having a closed end, a piston member located in said housing for longitudinal movement toward and away from said closed end and defining with said closed end a reservoir of variable capacity, said piston member having a pair of integral, spaced, circumferential ring-like members each of a diameter to fit closely into respective portions of said housing, said spaced ring-like members defining an essentially toroidally-shaped high pressure chamber between the inner surface of the housing and the outer surface of said piston member, said piston member being of generally cylindrical configuration and defining therein an accumulator, said accumulator comprising an accumulator chamber in which fluid of the fluid system may reside, fluid port means for providing fluid communication between said accumulator chamber and said high pressure chamber, and compressible means in said piston member against which the system pressure in said accumulator chamber may manifest itself, said compressible means serving to deliver pressurized fluid from said accumulator chamber to said high pressure chamber during a drop in pressure in said high pressure chamber due to a sudden demand for high pressure fluid in the system, said ring-like member nearest the closed end of said housing presenting a larger area to the fluid of said high pressure chamber than the other said ring-like member, fluid port means located in the wall of said housing for providing fluid communication to said high-pressure chamber, additional fluid port means for providing fluid communication to the reservoir portion of said housing, the difference in areas of said circumferential ring-like members multiplied by the system pressure manifested in said high pressure chamber providing a net force tending to move said piston member toward the closed end of said housing so as to pressurize fluid contained in said reservoir portion of said housing.

2. A pressurized reservoir for use in a fluid system comprising a reservoir housing having a closed end, a piston member located in said housing for longitudinal movement toward and away from said closed end and defining with said closed end a reservoir of variable capacity, said piston member having a pair of integral, spaced, circumferential ring-like members each of a diameter to fit closely into respective portions of said housing, said spaced ring-like members defining an essentially toroidally-shaped high pressure chamber between the inner surface of the housing and the outer surface of said piston member, said ring-like member nearest the closed end of said housing presenting a larger area to the fluid of said high pressure chamber than the other said ring-like member, fluid port means located in the wall of said housing for providing fluid communication to said high-pressure chamber, additional fluid port means for providing fluid communication to the reservoir portion of said housing, the difference in areas of said circumferential ring-like members multiplied by the system pressure manifested in said high pressure chamber providing a net force tending to move said piston member toward the closed end of said housing so as to pressurize fluid contained in said reservoir portion of said housing, said piston member being in the form of a longitudinally movable accumulator assembly, inner piston means movable in sealed relation inside said accumulator assembly, fluid port means for admitting fluid from said high pressure chamber into the interior of said accumulator assembly on one side of said inner piston and compressible means inside said accumulator assembly on the remote side of said inner piston from said fluid whereby said inner piston can move during changes in demand for high pressure fluid in said system to provide accumulator function for said system.

3. A pressurized reservoir for use in a hydraulic system in which a demand for high pressure fluid may change, comprising a reservoir housing having a closed end, a piston member located in said housing for longitudinal movement toward and away from said closed end and defining with said closed end a reservoir of variable capacity, the inner diameter of said housing in the region of said closed end being larger than the inner diameter remote from said closed end, said piston member having spaced circumferential ring-like members, each of a diameter to fit closely into the respective dimensioned inner portions of said housing, said spaced ring-like members defining an essentially toroidally-shaped high pressure chamber between the inner surface of the housing and the outer surface of said piston member, fluid port means located in the wall of said housing for providing fluid communication to said high-pressure chamber, additional fluid port means for providing fluid communication to the reservoir portion of said housing, the difference in areas of said circumferential ring-like members multiplied by the system pressure manifested in said high pressure chamber providing a net force tending to move said piston member toward the closed end of said housing so as to pressurize fluid contained in said reservoir portion of said housing, said piston member defining therein an accumulator, said accumulator comprising an accumulator chamber in which fluid of the fluid system may reside, fluid port means for providing fluid communication between said accumulator chamber and said high pressure chamber, and compressible means in said piston member against which the system pressure in said accumulator chamber may manifest itself, said compressible means serving to deliver pressurized fluid from said accumulator chamber to said high pressure chamber during a drop in pressure in said high pressure chamber due to a sudden demand for high pressure fluid in the system.

4. The pressurized reservoir as defined in claim 3 in which said piston member is in the form of a longitudinally movable accumulator assembly, inner piston means movable in sealed relation inside said accumulator assembly, fluid port means for admitting fluid from said high pressure chamber into the interior of said accumulator assembly on one side of said inner piston and a compressible fluid inside said accumulator assembly on the remote side of said inner piston from said fluid, whereby said inner piston can move during changes in demand for high pressure fluid in said system to provide accumulator function for said system.

5. The pressurized reservoir as defined in claim 4 in which a pressure relief valve is located in said accumulator assembly between accumulator portion and reservoir portion, whereby excess system pressure can be ported directly into said reservoir.

6. A reservoir-accumulator arrangement for use in a closed hydraulic system comprising a housing having a closed end, an accumulator assembly located in said housing for longitudinal movement toward and away from said closed end and defining with said closed end a reservoir of variable capacity, the inner diameter of said housing in the region of said closed end being larger than the inner diameter remote from said closed end, said accumulator assembly having spaced circumferential ring-like members, each of a diameter to fit closely into the respective dimensioned inner portion of said housing, said spaced ring-like members defining an essentially toroidally-shaped high pressure chamber between the inner surface of said housing and the outer surface of said accumulator assembly, fluid port means located in the wall of said housing for providing fluid communication to said high-pressure chamber, other fluid port means for providing fluid communication to the reservoir portion of said housing, the difference in areas of said circumferential ring-like members multiplied by the system pressure manifested in said high pressure chamber providing a net force tending to move said accumulator assembly toward the closed end of said housing so as to pressurize fluid contained in said reservoir portion of said housing, additional fluid port means for admitting fluid from said high pressure chamber into one portion of said accumulator assembly, piston means movable in sealed relation inside said accumulator assembly against which said fluid may manifest itself, and compressible means located in a second portion of said accumulator assembly on the remote side of said piston from said fluid whereby said piston can move against said compressible means during changes in demand for high pressure fluid in said system to provide accumulator function for said system.

7. The arrangement as defined in claim 6 in which said fluid port means for providing fluid communication to said high-pressure chamber is connected to a source of hydraulic pressure, and said fluid port means for providing fluid communication to the reservoir portion of said housing is connected to the return line to said source.

8. The reservoir-accumulator arrangement as defined in claim 6 in which relief valve means are provided in said accumulator assembly for porting excess fluid from accumulator portion directly to reservoir portion, said relief valve means being located in a portion of said accumulator assembly in direct contact with the fluid of said reservoir.

9. The reservoir-accumulator as defined in claim 6 in which said compressible means is a compressed gas.

10. A pressurized reservoir for use in a hydraulic system comprising a reservoir housing having a closed end, a piston member located in said housing for longitudinal movement toward and away from said closed end and defining with said closed end a reservoir of variable capacity, the inner diameter of said housing in the region of said closed end being larger than the inner diameter remote from said closed end, and means for biasing said piston member toward the closed end of said housing so as to pressurize fluid contained in said reservoir portion of said housing, said means including a pair of circumferential ring-like members disposed upon said piston member in spaced relation, said ring-like members being of different diameters to fit closely into respectively dimensioned inner portions of said housing, said spaced ring-like members defining an essentially toroidally-shaped high pressure chamber between the inner surface of said housing and the outer surface of said piston member, the difference in areas of said circumferential ring-like members multiplied by the system pressure manifested in said high pressure chamber providing a net force tending to move said piston member toward the closed end of said housing to pressurize fluid contained in said reservoir portion of said housing, fluid port means in the wall of said housing for providing fluid communication to said high pressure chamber, and additional fluid port means for providing fluid communication to the reservoir portion of said housing.

References Cited in the file of this patent
UNITED STATES PATENTS

| | | |
|---|---|---|
| 1,971,048 | Parsons | Aug. 21, 1934 |
| 2,764,999 | Stanbury | Oct. 2, 1956 |
| 2,804,094 | Gratzmuller | Aug. 27, 1957 |
| 2,817,361 | Mercier | Dec. 24, 1957 |